US005535845A

United States Patent [19]
Buschur

[11] Patent Number: 5,535,845
[45] Date of Patent: Jul. 16, 1996

[54] AUTOMOTIVE HYDRAULIC SYSTEM AND METHOD

[75] Inventor: Jeffrey J. Buschur, Bellbrook, Ohio

[73] Assignee: ITT Automotive Electrical Systems, Inc., Auburn Hills, Mich.

[21] Appl. No.: 400,927

[22] Filed: Mar. 9, 1995

[51] Int. Cl.⁶ ............................................. B62D 5/07
[52] U.S. Cl. ................................... 180/417; 60/424
[58] Field of Search .................. 180/132, 133, 180/141, 142, 143, 79, DIG. 5; 60/420, 422, 424

[56] References Cited

U.S. PATENT DOCUMENTS

| | | | |
|---|---|---|---|
| 3,641,879 | 2/1972 | Week et al. | 60/424 X |
| 4,005,636 | 2/1977 | Dunn | 91/31 |
| 4,043,419 | 8/1977 | Larson et al. | 180/132 |
| 4,075,840 | 2/1978 | Jesswein | 60/422 |
| 4,130,990 | 12/1978 | Amedei et al. | 60/422 |
| 4,179,888 | 12/1979 | Goscenski, Jr. | 60/420 |
| 4,189,919 | 2/1980 | Goscenski, Jr. | 60/420 |
| 4,410,058 | 10/1983 | Dymond | 180/143 |
| 4,414,809 | 11/1983 | Burris | 60/424 |
| 4,446,697 | 5/1984 | Goscenski, Jr. | 60/443 |
| 4,463,557 | 8/1984 | Miller et al. | 60/422 |
| 4,470,259 | 9/1984 | Miller et al. | 60/422 |
| 4,488,569 | 12/1984 | Rau | 180/DIG. 5 X |
| 4,625,751 | 12/1986 | Gage | 180/DIG. 5 X |
| 4,738,330 | 4/1988 | Suzuki et al. | 180/141 |
| 4,966,066 | 10/1990 | Kauss et al. | 91/516 |

Primary Examiner—Kevin T. Hurley
Attorney, Agent, or Firm—Jacox, Meckstroth & Jenkins

[57] ABSTRACT

A fluid supply system provides hydraulic fluid to a series combination of an automotive fan motor and a power steering unit. There is a bypass line around the fan motor for prioritizing the operation of the power steering unit. A normally closed pressure sequencing valve opens the bypass line when the pressure across the overall series combination exceeds a predetermined limit. Optional second and third bypass lines are disclosed for respectively bypassing either the power steering unit or the fan motor in case of abnormal conditions therein.

13 Claims, 2 Drawing Sheets

AUTOMOTIVE HYDRAULIC SYSTEM AND METHOD

BACKGROUND OF THE INVENTION

This invention relates to the field of automotive hydraulic systems and has particular application to automotive hydraulic systems having a power steering system and another hydraulically powered device connected in series with the power steering system. In a typical application the other device may be a cooling fan run by a hydraulic motor.

Hydraulic fluid for a power steering unit is generally delivered by a constant flow rate pump. Flow continues at the prescribed volumetric rate, irrespective of system back pressure, so long as the pump is able to deliver it. That necessarily involves a risk of pump damage. Therefore pumps for such systems generally are provided with pressure relief lines which terminate the pumping action in case of excessive system loads. This saves the pump at the expense of temporary impairment of power steering and temporary loss of service from anything else which may be powered by the pump. Sometimes bypass lines are provided around individual components of the system, so as to avoid loss of the entire system when a localized abnormality is experienced.

Proper pump design calls for a pump having only the ability to supply the normal needs of the devices which it is serving. If a plurality of devices are being served, it is desirable that they share the hydraulic fluid on some basis of priority. Clearly power steering is a matter of high priority. So long as a power steering unit is operating normally, its needs for hydraulic fluid should receive preferred treatment.

A cooling fan performs an essential function in protecting the automotive engine from overheating. However, the fan operation may be temporarily halted without serious risk to the motor vehicle or to its passengers. This means that a cooling fan should operate in series with a power steering unit only on a low priority basis. If the load on the pump becomes excessive, then the needs of the cooling fan should be sacrificed.

SUMMARY OF THE INVENTION

This invention provides apparatus and method for supplying hydraulic fluid to series connected hydraulic devices on a prioritized basis. To that end a bypass line is connected around a low priority hydraulic device and selectively opened by a valve responsive to the back pressure of the entire series combination. In a preferred embodiment a hydraulic fan motor is connected in series with a power steering unit and bypassed by a bypass line fitted with a pressure responsive valve. The high pressure side of the valve activation mechanism is connected to the outlet side of the system pump, while the low pressure side of the valve activation mechanism is connected to the system reservoir.

Preferably the power steering unit is situated downstream of the fan motor and is bypassed by a second bypass line fitted with a second pressure responsive valve. The second pressure responsive valve bypasses the power steering unit when the power steering unit becomes overloaded, while the first pressure responsive valve bypasses the fan motor when the overall system load reaches a predetermined limit. A third bypass line may bypass the fan motor when a fan motor limit condition is reached.

It is therefore an object of this invention to provide a hydraulic fluid supply system which prioritizes the flow to a series arrangement of hydraulically powered devices and which is able to interrupt the flow to one powered unit without adversely affecting the others.

Other objects and advantages of the invention will be apparent from the following description, the accompanying drawings and the appended claims.

DESCRIPTION OF PREFERRED EMBODIMENT

Figure 1:
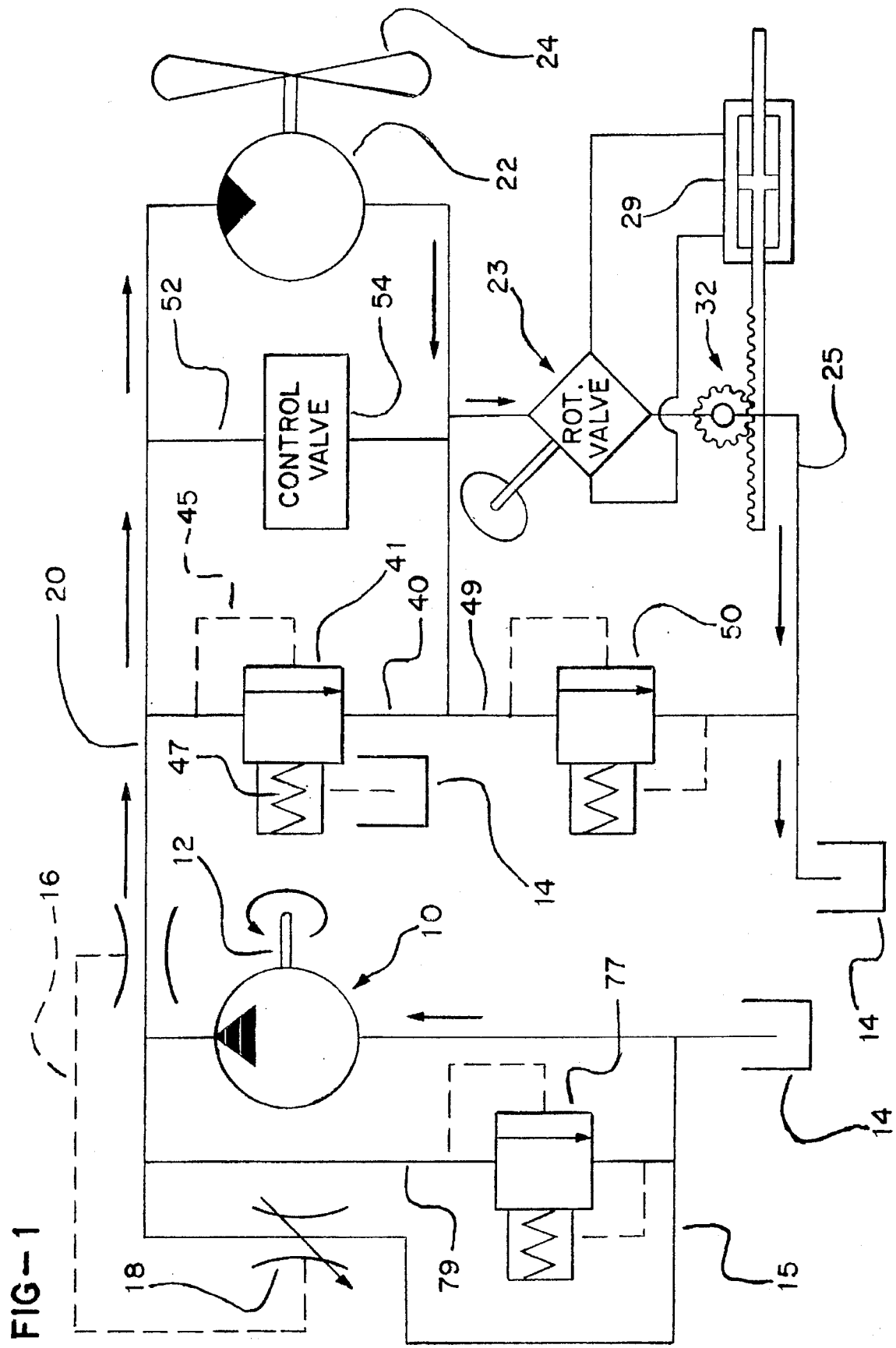
FIG. 1 is a schematic diagram of a hydraulic fluid supply system for a power steering unit connected in series with an upstream cooling fan.
Figure 2:
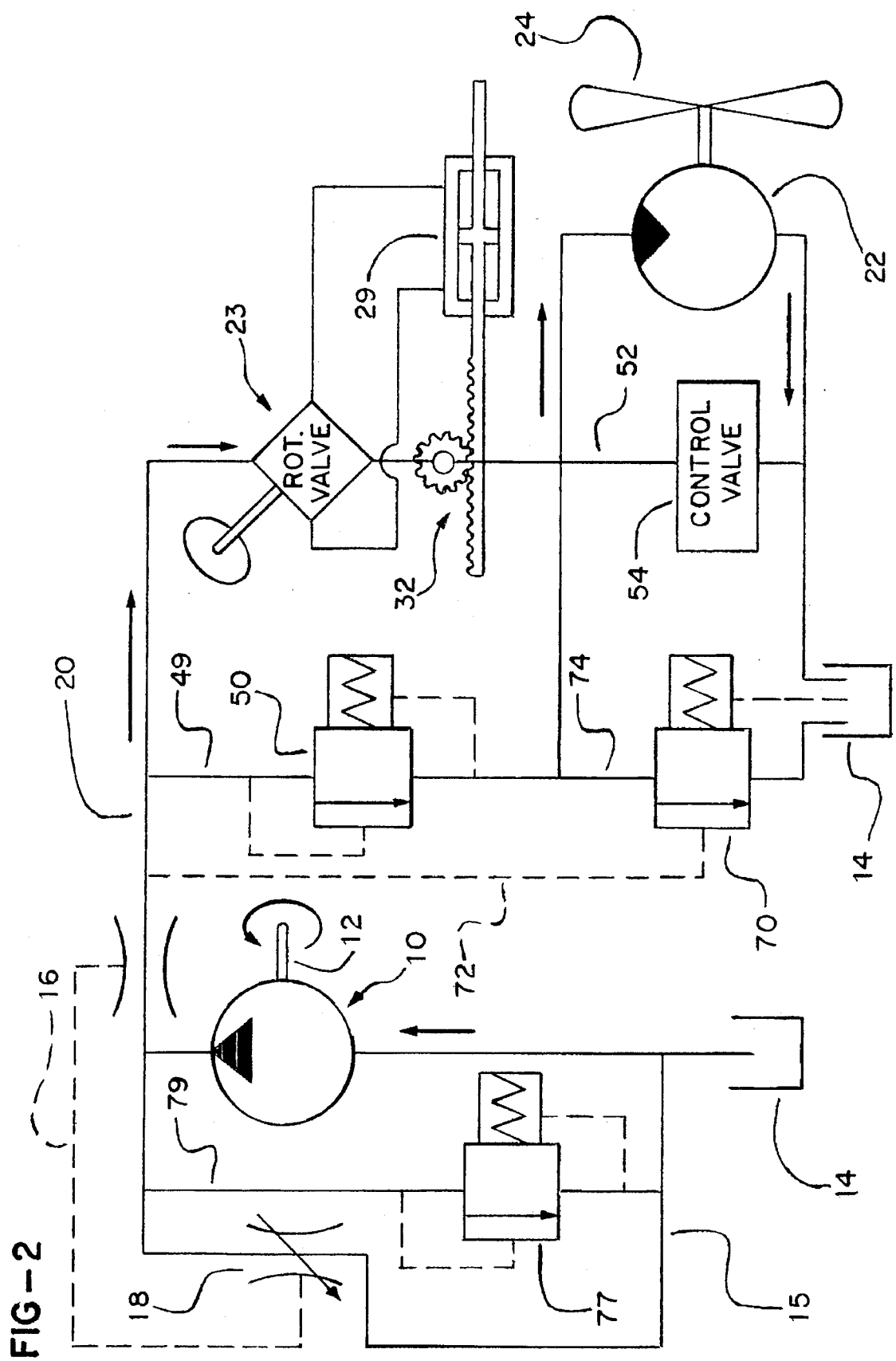
FIG. 2 is a schematic diagram of a hydraulic fluid supply system for a power steering unit connected in series with a downstream cooling fan.

A hydraulic fluid supply system according to the present invention may be configured as shown in either one of FIGS. 1 or 2. Referring first to FIG. 1, there is shown a pump 10 powered by an input shaft 12 and pumping hydraulic fluid from a reservoir 14 into a supply line 20. Pump 10 is of conventional design and has a bypass line 15 and a pressure feedback line 16. The flow through bypass line 15 is controlled by a pressure responsive valve 18.

Valve 18 operates under control of the pressure which is fed back by feedback line 16. As the pressure in feedback line 16 increases, valve 18 adjusts the flow through bypass line 15, so that supply line 20 receives a flow of hydraulic fluid at a constant volume rate Under certain operating conditions the hydraulic devices being supplied by pump 10 may partially block the flow of hydraulic fluid. This increases the system back pressure and raises the temperature at the pump. Prolonged exposure to high temperatures produces excessive wear on the pump, and may even cause immediate pump failure. Consequently there is a pressure relief line 79 which bypasses the pump. A pressure responsive valve 77 opens bypass line 79 at a predetermined pressure level, thereby recirculating the hot fluid into reservoir 14 to be replaced by fresh, cool liquid. At this point the supply line 20 receives hydraulic fluid at a constant pressure, rather than at a constant flow rate. Reservoir 14 operates at atmospheric pressure.

Supply line 20 provides hydraulic fluid to a series combination of a hydraulic motor 22 and a power steering unit 23. Hydraulic motor 22 is of conventional design and powers a cooling fan 24. Power steering unit 23 is positioned downstream from hydraulic motor 22 and discharges into reservoir 14. Discharge into reservoir 14 is via an unpressurized return line 25.

Power steering unit 23 comprises a conventional flexible rotary valve 27 balanced by a dual acting pressure cylinder 29. This is commonly referred to as open center steering. Power steering unit 23 may control the steering direction of a motor vehicle through a conventional rack and pinion arrangement 32. This is a high priority function which is given preference when the total series back pressure approaches the maximum level which valve 77 will permit. Therefore motor 22 is bypassed before the pressure across pump 10 reaches that level. For this purpose the operating system is provided with a first bypass line 40 and a first pressure responsive valve 41.

Valve 41 preferably is a normally closed, pressure responsive valve which is plumbed for operation as a pressure sequencing valve. Pressure responsive valve 41 is biased to a closed position by spring 47 installed in a cavity. An activation line 45 is connected to the upstream side of the valve and applies pressure to one face of a sliding piston (not illustrated). This pressure is opposed by spring 47 in a manner well known in the art.

In the embodiment of the invention illustrated in FIG. 1 the spring cavity of pressure responsive valve 41 is drained into reservoir 14. Consequently valve 41 responds to the total series pressure across pump 10. However, when 41 is opened only hydraulic motor 22 is bypassed. This reduces the back pressure against pump 10, while continuing the operation of power steering unit 23.

The system of FIG. 1 also has an optional second bypass line 49 fitted with a normally closed second pressure responsive valve 50. The second pressure responsive valve 50 drains its spring cavity into the valve outlet and therefore opens when the pressure across steering unit 23 reaches a predetermined maximum value, preferably lower than the operating pressure of valve 41. Therefore, if the power steering unit reaches an end-of-rack condition, the unit is bypassed before motor 22 is deprived of hydraulic fluid. However, if normal operation produces a combined series back pressure higher than the setting of valve 41 and lower than the setting of valve 77, then fan motor 22 is bypassed, and a normal, constant volume rate of hydraulic fluid flow will be directed through power steering unit 23. This might occur, for instance, if the operator performs an evasive steering maneuver while going up a steep grade on a hot day.

Motor 22 is also bypassed by a line 52 controlled by a control valve 54. Control valve 54 is normally closed and may be opened electrically or by other conventional means in response to pressure, temperature or other condition associated with motor 22. In the embodiment being described, control valve 54 controls the speed of fan motor 22 in response to temperature, pressure or other conditions associated with the motor 22. So long as everything is normal, hydraulic fluid flows from supply line 20, through motor 22, into and through power steering unit 23, returning to reservoir 14 via return line 25.

FIG. 2 illustrates an alternative embodiment. For convenience and clarity FIG. 2 uses the reference numerals of FIG. 1 for elements of similar function. Thus FIG. 2 shows a supply pump 10 driven by a shaft 12 to pump hydraulic fluid from a reservoir 14, and serve a fan motor 22 and a power steering unit 23. In the embodiment of FIG. 2 power steering unit 23 is situated upstream from fan motor 22, as opposed to the reverse arrangement of the first described embodiment. This necessarily means that all fluid seals in power steering unit 23 must operate at elevated pressure, at least as high as the pressure across fan motor 22. Prioritizing of the flow of hydraulic fluid is performed by a pressure responsive valve 70, similar in construction to valve 41 of the first embodiment. However, in view of the rearrangement of fan motor 22 and power steering unit 23, the control connections for the valve 70 are different. The downstream side of valve 70 drains into reservoir 14 as does the spring cavity for the valve. Valve 70 has an activation line 72 remotely connected to the high pressure side of power steering unit 23. Valve 70 controls a bypass line 74 which bypasses only fan motor 22. Thus valve 70 responds to a predetermined overall system back pressure by diverting hydraulic fluid only around fan motor 22. Power steering unit 23 continues operating on a priority basis. The valve 54 opens another line 52 around fan motor 22 to control fan speed.

As in the arrangement of FIG. 1, the alternative embodiment of FIG. 1 has a bypass line 49 around power steering unit 23. This line is controlled by a pressure responsive valve 50 which becomes activated in case of end-of-rack steering. While the arrangement of FIG. 2 is less preferred, it does prioritize power steering unit 23 over fan motor 22 in the event of an excessive combined hydraulic load.

While the forms of apparatus herein described constitute preferred embodiments of this invention, it is to be understood that this invention is not limited to these precise forms of apparatus, and that changes may be made therein without departing from the scope of the invention, which is defined in the appended claims.

What is claimed is:

1. An automotive steering and cooling system comprising:
    (a) an hydraulic pump for supplying hydraulic fluid at a controlled volume rate from a reservoir to an output line;
    (b) an hydraulic motor driven by said hydraulic fluid;
    (c) a cooling fan driven by said hydraulic motor;
    (d) a bypass line connected in parallel with said hydraulic motor;
    (e) said output line supplying fluid to an hydraulically powered steering system connected in series with the parallel combination of said hydraulic motor and said bypass line;
    (f) a normally closed valve installed in said bypass line; and
    (g) pressure sensitive valve actuation means responsive to a predetermined pressure at said output line.

2. The system according to claim 1 wherein the parallel combination of said hydraulic motor and said bypass line is positioned between said hydraulic pump and said hydraulically powered steering system.

3. The system according to claim 2, further comprising:
    (h) a second bypass line connected in parallel with said hydraulically powered steering system;
    (i) a normally closed second valve installed in said second bypass line; and
    (j) second pressure sensitive valve actuation means responsive to a predetermined second pressure across said hydraulically powered steering system for opening said second valve.

4. The system according to claim 3, further comprising:
    (k) a third bypass line connected in parallel with said hydraulic motor;
    (l) a normally closed third valve installed in said third bypass line; and
    (m) means responsive to a predetermined condition of said hydraulic motor for opening said third valve.

5. An automotive steering and cooling system comprising:
    (a) an hydraulic pump for supplying hydraulic fluid at a controlled volume rate from a reservoir to an output line;
    (b) an hydraulic motor driven by said hydraulic fluid;
    (c) a cooling fan driven by said hydraulic motor;
    (d) a bypass line connected in parallel with said hydraulic motor;
    (e) said output line supplying fluid to an hydraulically operated power steering unit connected in series with the parallel combination of said hydraulic motor and said bypass line; and
    (f) a normally closed pressure sequencing valve installed in said bypass line and connected for admitting a flow of said hydraulic fluid through said bypass line when there is an hydraulic pressure differential in excess of a predetermined amount at said output line.

6. A method for delivering fluid in an automotive steering and cooling system, comprising the steps of:

providing a plurality of devices which include a hydraulically operated power steering unit connected in series with a parallel combination of a hydraulic motor and a bypass line;

supplying the fluid at a controlled volume rate from a reservoir to an output line;

providing a normally closed pressure responsive valve in said bypass line;

coupling the plurality of devices to the output line; and admitting a flow of the fluid through the bypass line when a predetermined pressure is reached at said output line.

7. The method as recited in claim 6, further comprising:

bypassing the hydraulic motor.

8. The method as recited in claim 6, further comprising the step of:

prioritizing the hydraulic motor and the power steering unit.

9. The method as recited in claim 8, further comprising:

bypassing the hydraulic motor.

10. The method as recited in claim 9, further comprising the steps of:

identifying the hydraulic motor as a low priority device;

bypassing the hydraulic motor with the bypass line.

11. The method as recited in claim 10, further comprising the step of:

using the pressure responsive valve to effect said bypassing of the hydraulic motor.

12. The method as recited in claim 10, further comprising:

situating a second pressure responsive valve in operative relationship with the power steering unit; and selectively actuating the second pressure responsive to bypass the power steering unit.

13. An automotive hydraulic system comprising:

(a) an hydraulic pump (10) for supplying hydraulic fluid at a controlled volume rate from a reservoir (14) to an output line;

(b) a first hydraulic device (22) driven by said hydraulic fluid;

(c) a bypass line (40, 74) for bypassing hydraulic fluid around said first hydraulic device;

(d) a second hydraulic device (23) connected in series with said first hydraulic device;

(e) a normally closed valve (41, 70) installed in said bypass line; and (f) pressure sensitive valve actuation means (45, 47, 72) responsive to a predetermined pressure at said output line.

\* \* \* \* \*